US012633658B2

(12) United States Patent
Liu et al.

(10) Patent No.: US 12,633,658 B2
(45) Date of Patent: May 19, 2026

(54) TUNABLE ANTENNA CONTROL METHOD AND APPARATUS, AND TUNABLE ANTENNA SYSTEM

(71) Applicants: Beijing BOE Technology Development Co., Ltd., Beijing (CN); BOE TECHNOLOGY GROUP CO., LTD., Beijing (CN)

(72) Inventors: Zongmin Liu, Beijing (CN); Ge Ou, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 382 days.

(21) Appl. No.: 18/264,192

(22) PCT Filed: Sep. 22, 2022

(86) PCT No.: PCT/CN2022/120537
§ 371 (c)(1),
(2) Date: Aug. 3, 2023

(87) PCT Pub. No.: WO2024/060132
PCT Pub. Date: Mar. 28, 2024

(65) Prior Publication Data
US 2025/0007156 A1 Jan. 2, 2025

(51) Int. Cl.
*H01Q 3/36* (2006.01)

(52) U.S. Cl.
CPC .................................... *H01Q 3/36* (2013.01)

(58) Field of Classification Search
CPC ........... H01Q 3/36; G06N 3/063; H04B 7/185
See application file for complete search history.

(56) References Cited

U.S. PATENT DOCUMENTS

2022/0013903 A1* 1/2022 Evans ..................... H01P 3/006
2022/0094418 A1 3/2022 Polese et al.
(Continued)

FOREIGN PATENT DOCUMENTS

CN 110427669 A 11/2019
CN 112909551 A 6/2021
(Continued)

OTHER PUBLICATIONS

Jinkyu Bang et al., "Predicting Power Density of Array Antenna in mmWave Applications with Deep Learning," IEEE Access, Aug. 5, 2021, vol. 9, pp. 111030-111038.
(Continued)

*Primary Examiner* — Awat M Salih
(74) *Attorney, Agent, or Firm* — MUNCY, GEISSLER, OLDS & LOWE, P.C.

(57) ABSTRACT

The present disclosure provides a tunable antenna control method and apparatus, and a tunable antenna system. The tunable antenna control method includes: acquiring a beam pointing angle of a tunable antenna, calculating a phase-configuration parameter according to the beam pointing angle through a parameter calculation model, where the parameter calculation model is an artificial intelligence model taking the beam pointing angle as an input and the phase-configuration parameter of a phase shifter as an output, and controlling the phase shifter of the tunable antenna to perform phase configuration according to the phase-configuration parameter outputted by the parameter calculation model.

20 Claims, 6 Drawing Sheets

(56) References Cited

U.S. PATENT DOCUMENTS

| | | | | |
|---|---|---|---|---|
| 2024/0056856 | A1* | 2/2024 | Lin | H04W 24/10 |
| 2024/0063537 | A1* | 2/2024 | Liu | H01Q 3/44 |
| 2024/0356625 | A1* | 10/2024 | Walker | H04B 7/15528 |
| 2024/0394871 | A1* | 11/2024 | Zhang | G06T 7/11 |

FOREIGN PATENT DOCUMENTS

| | | | |
|---|---|---|---|
| CN | 113541759 | A | 10/2021 |
| CN | 114300838 | A | 4/2022 |
| CN | 114330695 | A | 4/2022 |
| CN | 113466782 | B | 9/2022 |

OTHER PUBLICATIONS

Min Chen et al., "Deep Neural Network for Estimation of Direction of Arrival with Antenna Array," IEEE Access, Jul. 28, 2020, vol. 8, pp. 140688-140698.

Pengdi Wang, "Design and Optimization of Silicon-Based Optical Phased Array for LIDAR," Thesis, Hangzhou University, Jun. 2021, 83 pages including English translation of Chapter 5 (pp. 2-12) and Abstract (pp. 19-20).

* cited by examiner

TUNABLE ANTENNA CONTROL METHOD AND APPARATUS, AND TUNABLE ANTENNA SYSTEM

CROSS REFERENCE TO RELATED APPLICATIONS

The present application claims the benefit of and is the U.S. national phase of PCT Application No. PCT/CN2022/120537 filed on Sep. 22, 2022, which is incorporated by reference herein in its entirety.

TECHNICAL FIELD

The present disclosure relates to the field of thin-film communications technology, and in particular to a tunable antenna control method and apparatus, and a tunable antenna system.

BACKGROUND

A liquid crystal phased array antenna uses the phase shifter which is formed based on a characteristic of an adjustable dielectric constant of a liquid crystal as a phase shift unit. During the working process, the liquid crystal molecules rotate under the action of an electric field force, so as to change the dielectric constant, and thus change a transmission speed of an electromagnetic wave, thereby to generate a phase difference under the condition of a transmission line having a same length.

SUMMARY

The present disclosure provides in some embodiments a tunable antenna control method and apparatus, and a tunable antenna system.

In a first aspect, the present disclosure provides in some embodiments a tunable antenna control method, including: acquiring a beam pointing angle of a tunable antenna, calculating a phase-configuration parameter according to the beam pointing angle through a parameter calculation model, where the parameter calculation model is an artificial intelligence model taking the beam pointing angle as an input and the phase-configuration parameter of a phase shifter as an output, and controlling the phase shifter of the tunable antenna to perform phase configuration according to the phase-configuration parameter outputted by the parameter calculation model.

In some embodiments of the present disclosure, the phase shifter is a tunable phase shifter including a tunable medium, and the tunable medium is one of a liquid crystal, a ferroelectric material or a ferrite material.

In some embodiments of the present disclosure, the acquiring the beam pointing angle of the tunable antenna, includes: acquiring azimuth information of a target satellite, determining state information of the tunable antenna according to a position and a posture of the tunable antenna, and determining the beam pointing angle of the tunable antenna according to the azimuth information and the state information.

In some embodiments of the present disclosure, the acquiring the azimuth information of the target satellite, includes: calculating the azimuth information of the target satellite based on pre-stored satellite position-related information and a current time, and/or determining the azimuth information of the target satellite according to ephemeris information, where the ephemeris information includes broadcast ephemeris and/or post-processing ephemeris.

In some embodiments of the present disclosure, the determining the beam pointing angle of the tunable antenna according to the azimuth information and the state information, includes: unifying the azimuth information and the state information into a same coordinate system through coordinate system transformation; and calculating the beam pointing angle of the tunable antenna in the same coordinate system.

In some embodiments of the present disclosure, after the controlling the phase shifter of the tunable antenna to perform phase configuration according to the phase-configuration parameter outputted by the parameter calculation model, the method further includes: acquiring a level ratio of the tunable antenna in a case that the ephemeris information is not acquired, optimizing the phase-configuration parameter of the phase shifter in a case that the level ratio is less than a preset ratio threshold, and taking the phase-configuration parameter of the phase shifter as a phase-configuration result of the phase shifter in a case that the level ratio is not less than the preset ratio threshold.

In some embodiments of the present disclosure, before the calculating the phase-configuration parameter according to the beam pointing angle through the parameter calculation model, the method further includes:

- creating an auto-encoder, where the auto-encoder includes an encoder and a decoder, the encoder is an artificial intelligence model taking the phase-configuration parameter as an input and the beam pointing angle as an output, the decoder is an artificial intelligence model taking the beam pointing angle as an input and the phase-configuration parameter as an output, and the output of the encoder serves as the input of the decoder,
- creating a loss function and adjusting a parameter of the auto-encoder according to the loss function, where the loss function is determined according to a first difference and a second difference, the first difference is a difference between input data and output data, the output data is data outputted by the decoder after inputting the input data into the encoder of the auto-encoder, and the second difference is determined according to a fitting loss of the encoder,
- taking the decoder as the parameter calculation model in a case that the loss function satisfies a preset training condition, where the preset training condition includes at least one of the loss function being converged or the quantity of iterations of the loss function reaching a preset quantity threshold.

In some embodiments of the present disclosure, the encoder includes a target input layer and N hidden layers arranged sequentially, N being an integer greater than 1, where an N-th hidden layer serves as an output layer of the encoder, a dimension of the target input layer is determined according to the quantity of phased array units of the tunable antenna, and a dimension $u_i$ of an i-th hidden layer in the N hidden layers satisfies $u_i=\text{ceil}(u_{i-1}/\sigma)$, where ceil( ) is a round-up function, a value of $\sigma$ is 2 or 4, and i is an integer greater than 1 and less than N−2.

In some embodiments of the present disclosure, a dimension of the N-th hidden layer in the N hidden layers is 1, and a dimension of a (N−1)-th hidden layer is less than or equal to 32.

In some embodiments of the present disclosure, the decoder includes M hidden layers and a target output layer arranged sequentially, M being a positive integer, where a first hidden layer of the M hidden layers serves as an input layer of the decoder, a dimension of the first hidden layer of the M hidden layers is the same as the dimension of the N-th hidden layer of the N hidden layers of the encoder, and the dimension of the target input layer is the same as a dimension of the target output layer.

In some embodiments of the present disclosure, a dimension $v_i$ of a j-th hidden layer of the M hidden layers satisfies $v_j = \text{ceil}(v_j * \sigma)$.

In some embodiments of the present disclosure, the decoder and/or the encoder further includes an activation layer corresponding to each one of part or all of the hidden layers, and the activation layer is arranged after a corresponding hidden layer.

In some embodiments of the present disclosure, the activation layer includes a hyperbolic tangent function or a rectified linear unit.

In a second aspect, the present disclosure further provides in some embodiments a tunable antenna control apparatus, including: an angle acquisition module, configured to acquire a beam pointing angle of a tunable antenna, a phase-configuration parameter calculation module, configured to calculate a phase-configuration parameter according to the beam pointing angle through a parameter calculation model, where the parameter calculation model is an artificial intelligence model taking the beam pointing angle as an input and the phase-configuration parameter of a phase shifter as an output, and a phase-configuration control module, configured to control the phase shifter of the tunable antenna to perform phase configuration according to the phase-configuration parameter outputted by the parameter calculation model.

In a third aspect, the present disclosure further provides in some embodiments a tunable antenna system configured to perform the above-mentioned tunable antenna control method.

In a fourth aspect, the present disclosure further provides in some embodiments an electronic device including: a memory, a processor, and a program stored in the memory and capable of being executed by the processor; the processor is configured to read the program in the memory to implement the steps of the above-mentioned method in the first aspect.

In a fifth aspect, the present disclosure further provides in some embodiments a readable storage medium having a program stored thereon, the program implementing, when executed by a processor, the steps of the above-mentioned method in the first aspect.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Apparently, the following drawings merely relate to some embodiments of the present disclosure, and based on these drawings, a person of ordinary skill in the art may obtain other drawings without any creative effort.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

Terms such as “first” and “second” in the embodiments of the present disclosure are used to differentiate similar objects, and not necessarily used to describe a specific sequence or order. Moreover, terms “include”, “have” and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device. In addition, the expression “and/or” in the present disclosure denotes at least one of connected objects. For example, A and/or B and/or C includes 7 situations of A alone, B alone, C alone, A and B, B and C, A and C, and A, B and C.

The present disclosure provides in some embodiments a tunable antenna control method.

In one embodiment of the present disclosure, the tunable antenna control method may be applied to a tunable antenna system.

In one embodiment of the present disclosure, the tunable antenna includes a phase shifter. Furthermore, in some embodiments of the present disclosure, the phase shifter is a tunable phase shifter, thereby to realize coordinated control of the antenna.

In some embodiments of the present disclosure, the tunable phase shifter includes a tunable medium, and the tunable medium is one of a liquid crystal, a ferroelectric material or a ferrite material. In the embodiment of the present disclosure, only a case where the tunable medium is the liquid crystal is taken as an example for illustration, and accordingly, the phase shifter is specifically a liquid crystal phase shifter. Apparently, when a type of phase shifter is adjusted, the technical solutions of the embodiments of the present application may be adjusted adaptively, and the obtained technical solutions should also be considered to be within the scope of the present application.

Figure 1:
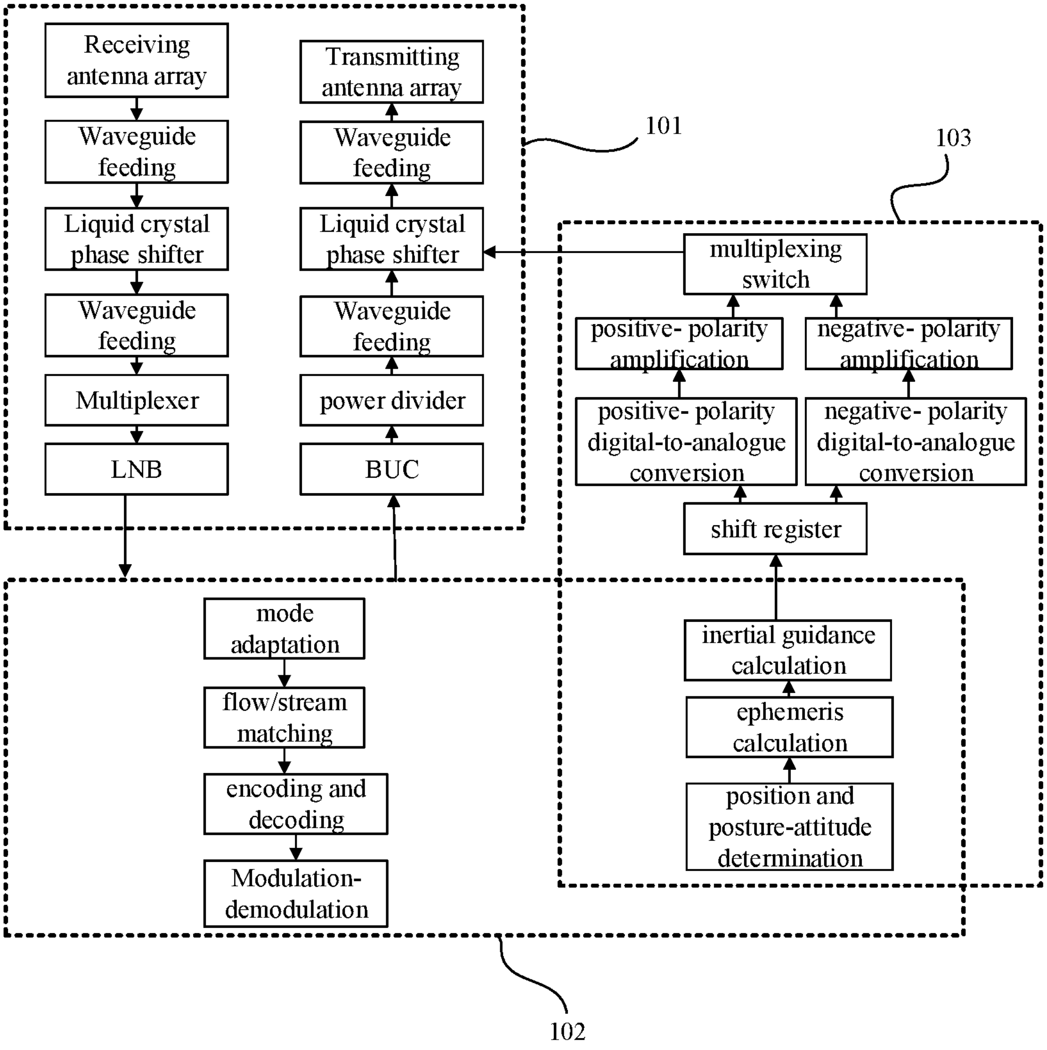
FIG. 1 is a schematic view showing a tunable antenna according to one embodiment of the present disclosure.

The tunable antenna system may particularly be a liquid crystal phased array antenna system, as shown in FIG. 1, which in one embodiment mainly includes an antenna feed system 101, a wave control system 102 and a baseband system 103.

With continuing reference to FIG. 1, the antenna feed system 101 is configured to: receive an electromagnetic wave in a satellite communication frequency band via a receiving antenna array, send the electromagnetic wave via the receiving antenna array, feed in and out (waveguide feeding) a guided wave, process a received signal via a LNB (Low Noise Block) and a multiplexer, and process a transmitting signal via a BUC (Block Up-Converter) and a power divider.

The wave control system 102 includes a shift register, a positive-polarity digital-to-analogue conversion module, a positive-polarity amplification, a negative-polarity digital-to-analogue conversion module, a negative-polarity amplification and a multiplexing switch. The wave control system is mainly used to drive the phase shifter, so as to achieve beam pointing control.

The baseband system 103 is responsible for signal mode adaptation, flow/stream matching, encoding and decoding, modulation and demodulation, etc.

In some embodiments of the present disclosure, it further requires the wave control system 102 and the baseband system 103 to determine position and posture information of the tunable antenna based on a position and posture-determination function of the antenna system, perform ephemeris calculations based on ephemeris information to determine the satellite related information, perform predictions of the antenna position and posture information in conjunction with inertial guidance calculations, etc.

The baseband system 103 may be implemented in different ways because encoding and modulation manners of a satellite communication system is relatively simple as compared with a mobile communication system. Illustratively, it may be implemented in the manner of FPGA (Field Programmable Gate Array, field Programmable Gate Array)+ARM (Advanced RISC (Reduced Instruction Set Computer) Machine), FPGA+DSP (Digital Signal Processing), FPGA+ARM+DSP, and FPGA integrated with PS (Processing System) and PL (Programmable Logic).

An voltage applying module is mainly used to drive the phase shifter according to a scanning algorithm through a combination of an analog-to-digital converter and an operational amplifier or designing a dedicated chip, so as to realize beam control.

The liquid crystal phased array antenna adopts the phase shifter formed based on a characteristic of an adjustable dielectric constant of a liquid crystal as a phase shift unit, and has such advantages as low cost, low profile and conformal. The mainstream technical solutions of the phase shifter include a microstrip transmission line, a coplanar waveguide transmission line, and a periodic variable capacitor, etc. and phase shift is realized essentially as follows. An electric field is formed by applying a driving voltage, and a liquid crystal molecule rotates under the action of an electric field force, so as to change the dielectric constant, and thus change a transmission speed of an electromagnetic wave, thereby to generate a phase difference under the condition of a transmission line having a same length.

Figure 2:
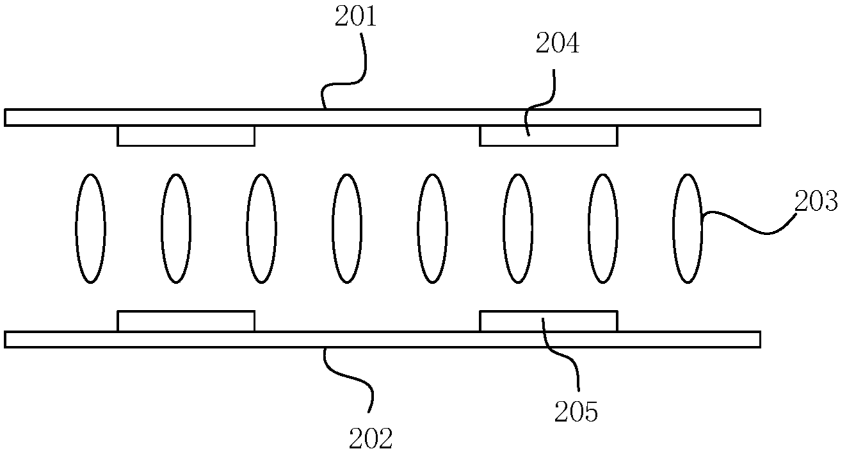
FIG. 2 is a schematic view showing a phase shifter according to one embodiment of the present disclosure.

As shown in FIG. 2, a typical phase shifter includes a first substrate 201 and a second substrate 202 arranged opposite to each other to form a cell, and liquid crystal molecules 203 located between the first substrate 201 and the second substrate 202, a first electrode 204 and a second electrode 205 are arranged on the first substrate 201 and the second substrate 202 respectively. During the implementation, the deflection of the liquid crystal molecules 203 is controlled by the first electrode 204 and the second electrode 205. The phase shifter has the advantage that the phase is continuously adjustable, so that the beam pointing accuracy is higher.

As shown in Table 1, taking a 1*50 one-dimensional linear array antenna as an example, in the related art, a relationship curve between all phase shift degrees of the phase shifter and control codes is usually calibrated through near-field and far-field tests, and according to a use scenario, a corresponding relationship between a beam pointing angle and the phase shift degree of each phase shifter and/or the control code is calculated in advance to form a pointing angle-code table, and stored in a controller.

In use, the controller obtains the beam pointing angle according to a posture of the terminal antenna and an azimuth of a target satellite, then obtains a phase shift amount/control voltage of each phase shifter through searching the stored table, and then drives the phase shifter through a voltage applying module to realize beamforming.

TABLE 1

| Pointing angle-code table 1 | | | | | | | |
|---|---|---|---|---|---|---|---|
| Angle/° | Driving voltage for phase shifter/V | | | | | | |
| θ1 | V1, 1 | V1, 2 | V1, 3 | . . . | V1, 48 | V1, 49 | V1, 50 |
| θ2 | V2, 1 | V2, 2 | V2, 3 | . . . | V2, 48 | V2, 49 | V2, 50 |
| θ3 | V3, 1 | V3, 2 | V3, 3 | . . . | V3, 48 | V3, 49 | V3, 50 |
| . . . | | | | . . . | | | |
| θi-2 | Vi-2, 1 | Vi-2, 2 | Vi-2, 3 | . . . | Vi-2, 48 | Vi-2, 49 | Vi-2, 50 |
| θi-1 | Vi-1, 1 | Vi-1, 2 | Vi-1, 3 | . . . | Vi-1, 48 | Vi-1, 49 | Vi-1, 50 |
| θi | Vi, 1 | Vi, 2 | Vi, 3 | . . . | Vi, 48 | Vi, 49 | Vi, 50 |

If extended to two dimensions, as shown in Table 2, a look-up table of another dimension is required, and the voltages of the two look-up tables in the area of overlapping elements are identical.

TABLE 2

| Pointing angle-code table 2 | | | | | | | |
|---|---|---|---|---|---|---|---|
| Angle/° | Driving voltage for phase shifter/V' | | | | | | |
| φ1 | V'1, 1 | V'1, 2 | V'1, 3 | . . . | V'1, 48 | V'1, 49 | V'1, 50 |
| φ2 | V'2, 1 | V'2, 2 | V'2, 3 | . . . | V'2, 48 | V'2, 49 | V'2, 50 |
| φ3 | V'3, 1 | V'3, 2 | V'3, 3 | . . . | V'3, 48 | V'3, 49 | V'3, 50 |
| . . . | | | | . . . | | | |
| φi-2 | V'i-2, 1 | V'i-2, 2 | V'i-2, 3 | . . . | V'i-2, 48 | V'i-2, 49 | V'i-2, 50 |
| φi-1 | V'i-1, 1 | V'i-1, 2 | V'i-1, 3 | . . . | V'i-1, 48 | V'i-1, 49 | V'i-1, 50 |
| φi | V'i, 1 | V'i, 2 | V'i, 3 | . . . | V'i, 48 | V'i, 49 | V'i, 50 |

However, when the above-mentioned pointing angle-code table is stored, it requires a large amount of storage space. Furthermore, the precision and the quantity of the beam pointing angles calculated in advance are both limited discrete quantities. During the implementation, phase configuration is only performed by determining a beam pointing angle in the pointing angle-code table which is close to an actual beam pointing angle as a degree of a corresponding phase shifter, so that the phase configuration precision is adversely affected. Moreover, a phase of the phase shifter is continuously adjustable, but only the results stored in the pointing angle-code table can be used in the related art, so that the performance of the phase shifter is not fully utilized.

Figure 3:
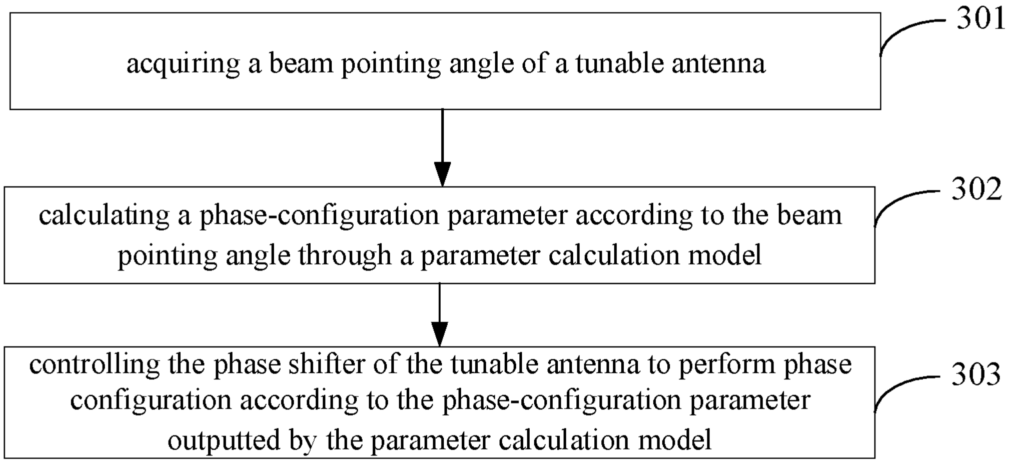
FIG. 3 is a flow chart of a tunable antenna control method according to one embodiment of the present disclosure.

As shown in FIG. 3, in one embodiment of the present disclosure, the tunable antenna control method includes the following steps.

Step 301: acquiring a beam pointing angle of a tunable antenna.

During the implementation, the beam pointing angle may be determined in various ways.

In one embodiment of the present disclosure, the step 101 includes: acquiring azimuth information of a target satellite, determining state information of the tunable antenna according to a position and a position of the tunable antenna, and determining the beam pointing angle of the tunable antenna according to the azimuth information and the state information.

In the embodiment of the present disclosure, a current position of the target satellite may be obtained in various manners.

In some embodiments of the present disclosure, the acquiring the azimuth information of the target satellite includes: calculating the azimuth information of the target satellite based on pre-stored satellite position-related information and a current time, and/or determining the azimuth information of the target satellite according to ephemeris information, where the ephemeris information includes broadcast ephemeris and/or post-processing ephemeris.

In one embodiment of the present disclosure, current azimuth information about the target satellite may be calculated based on pre-stored satellite position-related information in combination with the current time. In other embodiments of the present disclosure, the azimuth information of the target satellite may also be determined according to ephemeris. In specific, the azimuth information of the target satellite may be determined based on a prediction of the broadcast ephemeris, or post-processing ephemeris may be obtained to determine more accurate ephemeris information.

The state information of the tunable antenna mainly includes the position and posture of the tunable antenna. The acquisition of the state information of the tunable antenna may be implemented based on the wave control system 102 shown in FIG. 1.

The hardware implementation of the wave control system 102 includes a gyroscope module, a positioning module, an inertial navigation module, a voltage applying module, etc.

In order to obtain accurate antenna posture information, the gyroscope module may be a Micro Electro Mechanical systems gyroscope, a ring laser gyroscope and a fiber optic gyroscope, the positioning module may obtain the position azimuth information of the antenna, and may be a global positioning module, a Beidou positioning module, a Galileo positioning module and etc.

The inertial navigation module mainly uses a current position and information from the gyroscope to predict a future position, so as to realize a quick recovery after the signal is interrupted due to shielding and other reasons. The inertial navigation module may be a strap-down inertial navigation system or a platform inertial navigation system.

After the azimuth information of the target satellite and the state information of the tunable antenna are determined, it is able to determine the required beam pointing angle.

Step 302: calculating a phase-configuration parameter according to the beam pointing angle through a parameter calculation model.

The parameter calculation model is an artificial intelligence model taking the beam pointing angle as an input and the phase-configuration parameter of a phase shifter as an output.

Through the parameter calculation model, the above-mentioned pointing angle-code table is not needed, and during the implementation, it is able to calculate the corresponding phase parameter directly according to the beam pointing angle.

Step 303: controlling the phase shifter of the tunable antenna to perform phase configuration according to the phase-configuration parameter outputted by the parameter calculation model.

After the phase-configuration parameter are calculated, the phase-configuration adjustment of the phase shifter of the tunable antenna is performed according to the phase-configuration parameter, so as to enable the phase shifter to meet the requirements on signal transmission and reception.

In the technical solution of the present disclosure, it is able to directly perform phase configuration on the tunable antenna by predicting the corresponding relationship between the beam pointing angle and the degree of the phase shifter, so as to avoid the storage of the code table.

Furthermore, as compared with the related art where only a phase stored in the pointing angle-code table is applied to the phase shifter, in the technical solution of the present disclosure, the phase of the phase shifter can be continuously adjustable, so as to improve the signal transmission effect.

Figure 4:
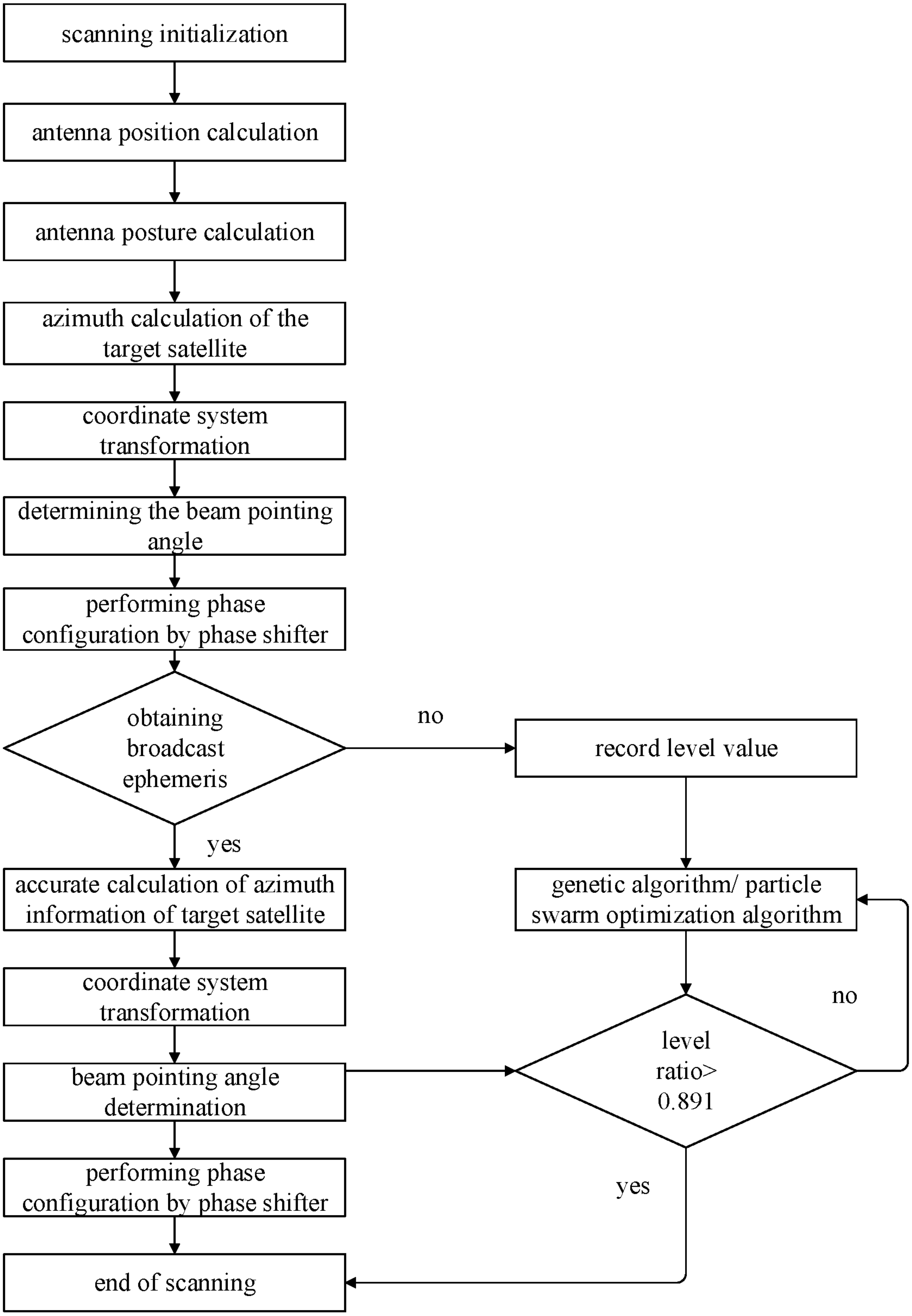
FIG. 4 is another flow chart of the tunable antenna control method according to one embodiment of the present disclosure.

As shown in FIG. 4, during the implementation, a scanning initialization is performed first, and then an antenna position calculation, an antenna posture calculation and an azimuth calculation of the target satellite are performed.

In some embodiments of the present disclosure, the determining the beam pointing angle of the tunable antenna according to the azimuth information and state information includes: unifying the azimuth information and the state information into a same coordinate system through coordinate system transformation, and calculating the beam pointing angle of the tunable antenna in the same coordinate system.

Next, coordinate system transformation may be performed to unify related information about the antenna and related information about the target satellite into the same coordinate system, so as to calculate the beam pointing angle.

Furthermore, after the beam pointing angle is calculated, the phase-configuration parameter is calculated through the parameter calculation model, and finally the phase shifter is controlled to perform phase configuration according to the calculated phase-configuration parameter.

In some embodiments of the present disclosure, ephemeris information may be further incorporated, so as to improve the accuracy for determining a position of the satellite.

Illustratively, when it is able to receive the ephemeris information, the position of the target satellite is more accurately calculated in combination with the ephemeris information. Next, coordinate system transformations are performed again, the beam pointing angle and phase-configuration parameter are calculated, and the phase shifter is controlled to perform phase configuration.

In some embodiments of the present disclosure, after the controlling the phase shifter of the tunable antenna to perform phase configuration according to the phase-configuration parameter outputted by the parameter calculation model, the method further includes: acquiring a level ratio of the tunable antenna in a case that the ephemeris information is not acquired, optimizing the phase-configuration parameter of the phase shifter in a case that the level ratio is less than a preset ratio threshold, and taking the phase-configuration parameter of the phase shifter as a phase-configuration result of the phase shifter in a case that the level ratio is not less than the preset ratio threshold.

In response to that the ephemeris information is not received, the phase-configuration result may be further optimized. For example, the level value may be recorded, and the phase-configuration result may be optimized in combination with a genetic algorithm, a particle swarm optimization algorithm, etc. until the level ratio of the tunable antenna is greater than the preset ratio threshold value. Illustratively, the preset ratio threshold value is 0.891. During the implementation, the preset ratio threshold value may be set according to the practical need.

In some embodiments of the present disclosure, the step of training the parameter calculation model is further included before the step 302, the parameter calculation model is pre-trained, and the step of training the parameter calculation model includes:

creating an auto-encoder;

creating a loss function and adjusting a parameter of the auto-encoder according to the loss function;

taking the decoder as the parameter calculation model in a case that the loss function satisfies a preset training condition.

The auto-encoder is a self-supervised learning method, which takes input data as a supervised signal to learn, transforms the input data into a low-dimensional hidden layer vector space by using the encoder, and reconstructs a high-dimensional original data through the decoder, so as to recover an original input approximately.

Figure 5:
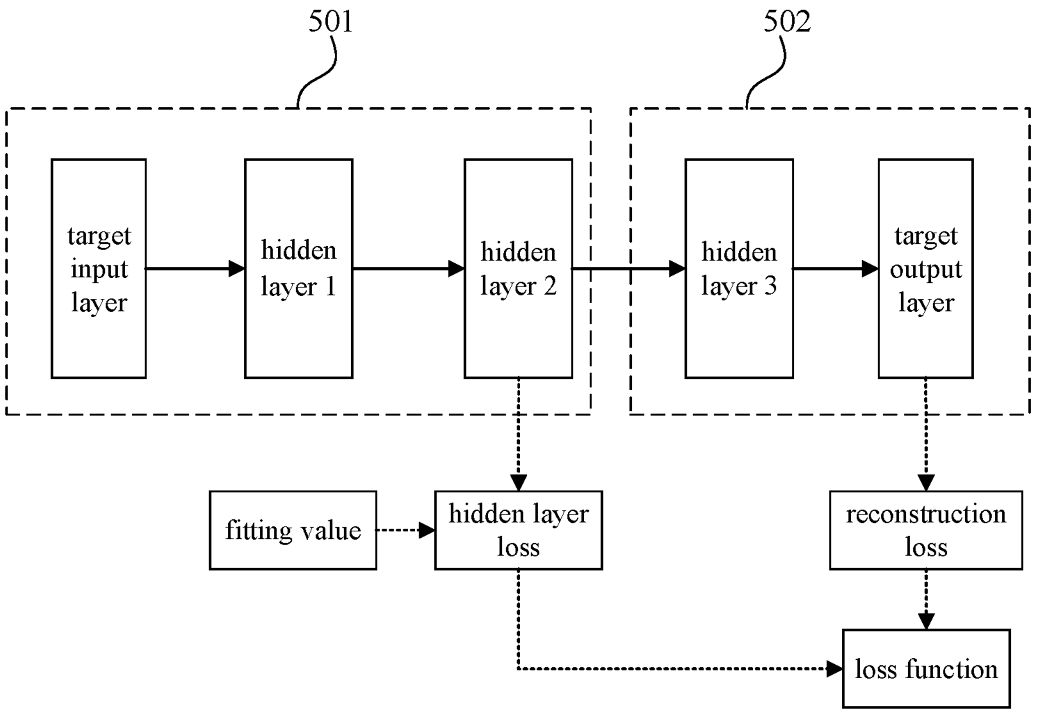
FIG. 5 is a schematic view showing an auto-encoder according to one embodiment of the present disclosure.

As shown in FIG. 5, in one embodiment of the present disclosure, the auto-encoder includes an encoder 501 and a decoder 502. The encoder 501 is an artificial intelligence model with the phase-configuration parameter as an input and the beam pointing angle as an output, and the decoder 502 is an artificial intelligence model with the beam pointing angle as an input and the phase-configuration parameter as an output, and the output of the encoder 501 serves as the input of the decoder 502.

With continuing reference to FIG. 5, the encoder 501 includes a target input layer and N hidden layers arranged sequentially, N being an integer greater than integer greater than 1. In the embodiment of the present disclosure, only two hidden layers (a hidden layer 1 and a hidden layer 2) are illustratively shown.

$$h_1 = f_{\theta_1}(x) = \sigma(W_1 x + b_1) \tag{1}$$

$$h_2 = f_{\theta_2}(h_1) = \sigma(W_2 h_1 + b_2) \tag{2}$$

Equations (1) and (2) correspond to encoding processes of the hidden layer 1 and the hidden layer 2, respectively.

In Equations (1) and (2), $f_{\theta_i}$ and σ( ) each represent a encoding function, $W_i$ and $b_i$ are each a encoding coefficient of the created encoder, and x is an input provided for the target input layer, $h_1$ is an output of the first hidden layer, and $h_2$ is an output of the second hidden layer.

An N-th hidden layer (the hidden layer 2 in this embodiment) serves as an output layer of the encoder 501.

The decoder 502 includes M hidden layers and a target output layer arranged sequentially, M being a positive integer. In the embodiment of the present disclosure, only one hidden layer is exemplarily shown. A first one of the M hidden layers (a hidden layer 3 in this embodiment) serves as an input layer of the decoder 502.

$$h_3 = f_{\theta_3}(h_2) = \sigma(W_3 h_2 + b_3) \tag{3}$$

$$x_0 = f_{\theta_4}(h_3) = \sigma(W_4 h_3 + b_4) \tag{4}$$

Equation (3) is a decoding process of the hidden layer 3, and Equation (4) is a decoding process of the target output layer, where $x_0$ represents an output result.

The encoder 501 takes the phase-configuration parameter as the input and the decoder 502 takes the phase-configuration parameter as the output, so that dimensions of the target input layer and the target output layer are the same and determined according to the input data. In a case that the artificial intelligence model is a neural network model, a dimension may also be referred to as the quantity of neurons of the artificial intelligence model.

It should be appreciated that, as the dimension of the input data increases, the quantity of hidden layers may be increased, otherwise the performance of the model may be adversely affected due to fewer layers, and under-fitting occurs.

It requires the encoder 501 to compress the input data to be of one dimension, and the decoder 502 to restore the one-dimensional data back to the input data, so the quantity of neurons needs to be adjusted when increasing the quantity of hidden layers. Model under-fitting occurs due to few neurons, while model over-fitting occurs due to too many hidden layers.

In one exemplary embodiment of the present disclosure, for a one-dimensional 51 linear array, the target input layer and the target output layer are each of 51 dimensions.

The output of the encoder 501 serves as the input of the decoder 502, so the dimension of the output layer of the encoder 501 (i.e., the N-th hidden layer of the N hidden layers of the encoder 501) is the same as the dimension of the input layer of the decoder 502 (i.e., the first hidden layer of the M hidden layers of the decoder 502). In one exemplary embodiment of the present disclosure, both the dimension of the output layer of the encoder 501 and the dimension of the input layer of the decoder 502 are 1.

In one exemplary embodiment of the present disclosure, a dimension of a (N−1)-th hidden layer of the encoder 501 is less than or equal to 32.

The dimension of the target input layer is determined according to the quantity of phased array units of the tunable antenna, and a dimension $u_i$ of an i-th hidden layer among the N hidden layers satisfies:

$$u_i = \text{ceil}\left(\frac{u_{i-1}}{\sigma}\right); \quad (5)$$

A dimension $v_i$ of a j-th hidden layer of the M hidden layers satisfies:

$$v_j = \text{ceil}\ (v_j * \sigma); \quad (6)$$

In the above equations (5) and (6), ceil( ) is a round-up function, a value of σ is 2 or 4, and i is an integer greater than 1 and less than N−2.

Figure 6:
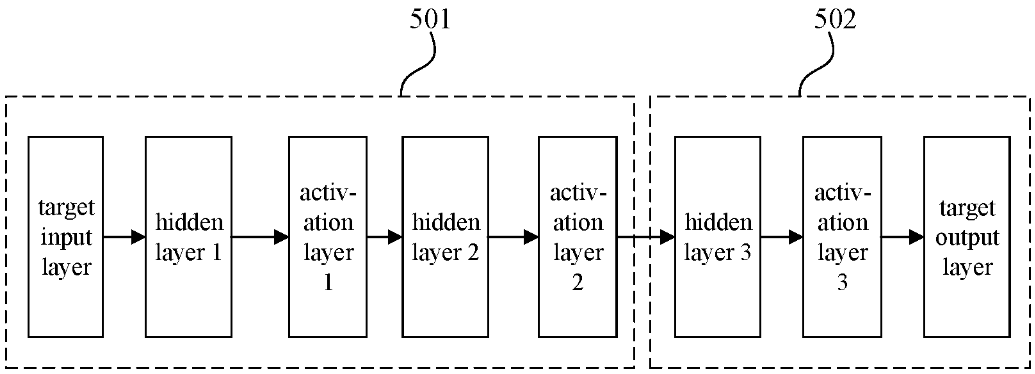
FIG. 6 is another schematic view showing the auto-encoder according to one embodiment of the present disclosure.

As shown in FIG. 6, in some embodiments of the present disclosure, the encoder 501 and/or decoder 502 further includes an activation layer corresponding to each one of part or all of the hidden layers, the activation layer is specifically a non-linear activation layer, and the non-linear activation layer is disposed after a corresponding hidden layer.

It should be appreciated that the phase shifter is generally driven by a voltage, and a corresponding relationship between the voltage and the phase shift amount is a non-linear, and is a unary quartic equation. In the embodiment of the present disclosure, a non-linear unit is added after the hidden layer of the original model, so as to improve the accuracy of the model.

In an exemplary embodiment of the present disclosure, the activation layer may include a hyperbolic tangent function:

$$\tanh = \frac{1 - \exp(-2x)}{1 + \exp(-2x)} \quad (7)$$

In another exemplary embodiment of the present disclosure, the activation layer includes a rectified linear unit:

$$ReLU(x) = \max(x, 0) \quad (8)$$

During the implementation, a training set is provided, and the training set includes input data x and fitting data y corresponding to x. Specifically, the input data x is a phase shift amount or a driving voltage of the phase shifter, and y is a degree of beam pointing angle.

In some embodiments of the present disclosure, in order to improve the data processing effect, a step of normalization processing may be further included. In specific, data in the training set may be mapped into an interval [0,1] according to a certain rule.

In a model learning and training process, the encoder 501 generates training data y0 in accordance with the input data x, and the decoder 502 generates an output result x0 in accordance with the generated training data y0. The output result x0 may be referred to as a result of the decoder 502 restoring the input data x in accordance with y0.

That is, a mapping relationship exists between the input data x and the fitting data y, and a mapping relationship also exists between the fitting data y and the input data x, and the encoder 501 and the decoder 502 are respectively used to learn and obtain the two mapping relationships.

In the embodiments of the present disclosure, the loss function is determined according to a first difference and a second difference, the first difference is a difference between input data and output data, the output data is data outputted by the decoder after inputting the input data into the encoder of the auto-encoder, and the second difference is determined according to a fitting loss of the encoder, In specific, the second difference is determined according to a difference between a beam pointing angle calculated by the encoder and a real beam pointing angle in the training set.

In an exemplary embodiment of the present disclosure, the loss function Loss is:

$$Loss = L(y, y0) + L(x, x0) \quad (9)$$

$$L(a, a0) = \frac{1}{n}\sum_{i=0}^{n}(a_i - a0_i)^2 \quad (10)$$

L( ) represents a function for performing a specific loss calculation. Illustratively, a mean square error loss function (11) or the like may be selected as the specific loss calculation function, L(x, x0) may be referred to as the above-mentioned first loss, and L(y, y0) may be referred to as the above-mentioned second loss, also called a hidden layer loss. Thus, in the embodiment of the present disclosure, the loss function is created according to the difference between the original input and the reconstructed data, so as to ensure a better representation of the data obtained by the auto-encoder.

In some embodiments of the present disclosure, different weight coefficients may also be set for the first loss and the second loss as needed.

The preset training condition includes at least one of the loss function being converged or the quantity of iterations of the loss function reaching a preset quantity threshold. When a value of the loss function Loss is less than a certain loss threshold, or the quantity of iterations reaches a certain quantity, the training of the model is considered to be completed, and at this time, the obtained decoder 502 is used as the parameter calculation model in the above-mentioned step 302.

In some embodiments of the present disclosure, after obtaining the parameter calculation model, the step of testing the parameter calculation model is further included.

During the implementation, the fitting data y in the training set is inputted into the parameter calculation model (i.e., the decoder 502) to obtain the output result x0.

In some embodiments of the present disclosure, when the training set data is normalized, the output result may also need to be inversely normalized.

The output result is compared with the input data x in the training set, so as to verify the accuracy of the parameter calculation model.

Figure 7:
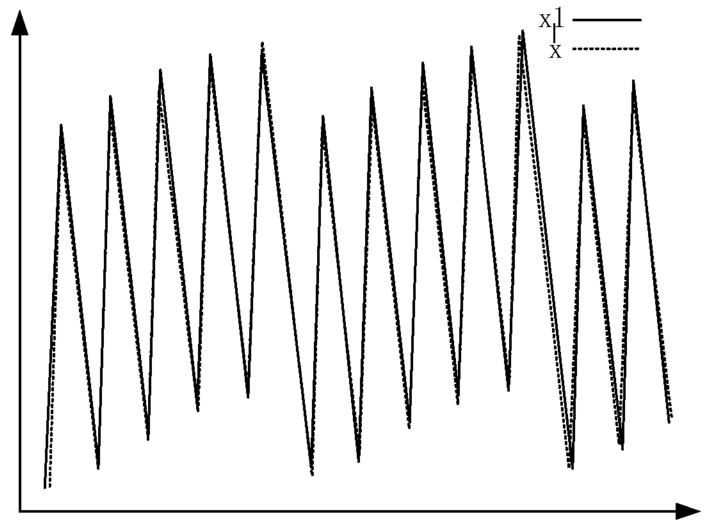
FIG. 7 is a schematic view showing a comparison between input data and verification results according to one embodiment of the present disclosure.

In one exemplary embodiment of the present disclosure, the quantity of samples of the input data x is 100, a dimension thereof is 51, and the quantity of samples of the fitting data y is 100. During the implementation, the fitting data y is inputted into the parameter calculation model, and a verification result x1 outputted by the parameter calculation model is obtained. As shown in FIG. 7, the input data x is highly consistent with the verification result x1.

In another exemplary embodiment of the present disclosure, a target beam pointing angle is set to 37.5°. According to an actual calculation, a phase-configuration table 1 of 51 array elements may be obtained, as shown in table 3.

TABLE 3

| Phase-configuration table 1 | | | | | | | | | | |
|---|---|---|---|---|---|---|---|---|---|---|
| 0 | 1 | 2 | 3 | 4 | 5 | 6 | 7 | 8 | 9 | 10 |
| 0 | 250.4229 | 140.8459 | 31.2688 | 281.6918 | 172.1147 | 62.5377 | 312.9606 | 203.3835 | 93.8065 | 344.229 |
| | 11 | 12 | 13 | 14 | 15 | 16 | 17 | 18 | 19 | 20 |
| | 234.652 | 125.075 | 15.498 | 265.921 | 156.344 | 46.767 | 297.19 | 187.613 | 78.036 | 328.459 |
| | 21 | 22 | 23 | 24 | 25 | 26 | 27 | 28 | 29 | 30 |
| | 218.882 | 109.305 | 359.728 | 250.151 | 140.573 | 30.996 | 281.419 | 171.843 | 62.265 | 312.688 |
| | 31 | 32 | 33 | 34 | 35 | 36 | 37 | 38 | 39 | 40 |
| | 203.111 | 93.534 | 343.957 | 234.38 | 124.803 | 15.226 | 265.649 | 156.072 | 46.495 | 296.917 |
| | 41 | 42 | 43 | 44 | 45 | 46 | 47 | 48 | 49 | 50 |
| | 187.341 | 77.763 | 328.187 | 218.609 | 109.032 | 359.456 | 249.878 | 140.301 | 30.724 | 281.147 |

Figure 8:
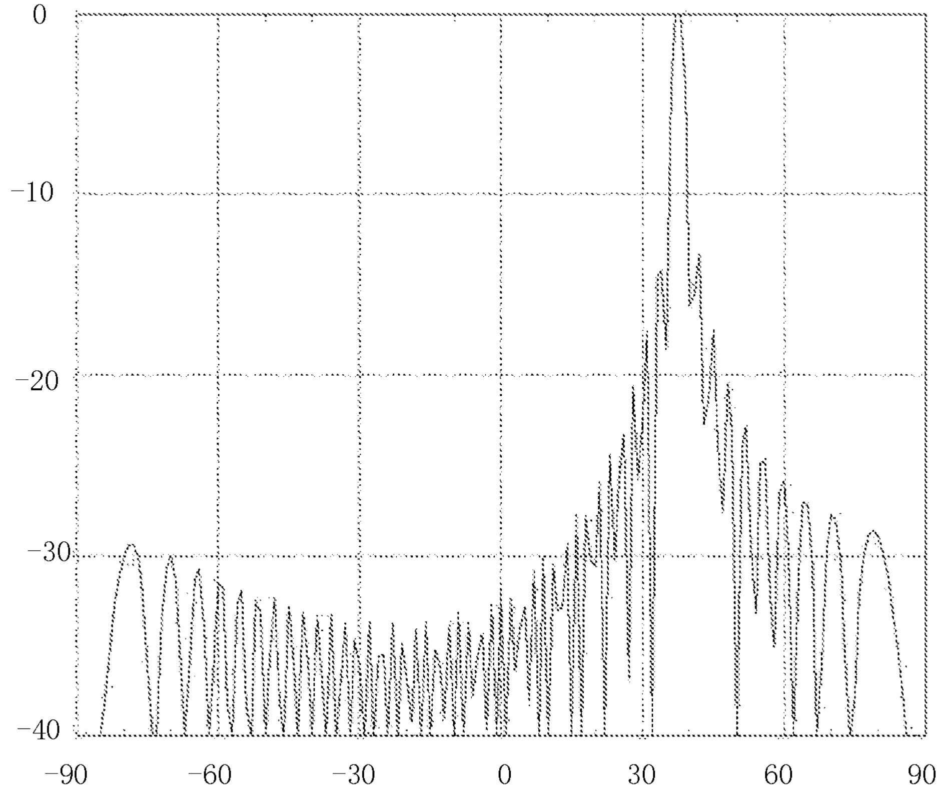
FIG. 8 is a diagram of calculated beam pointing angles according to one embodiment of the present disclosure.

Based on the above phase-configuration table shown in Table 3, a diagram of the beam pointing angle is shown in FIG. 8. It is derived that a main beam is around 37° to 38°, and a half power beam width is about 2.46°.

A phasing-configuration table 2 generated by the parameter calculation model in the embodiments of the present disclosure is shown as Table 4.

TABLE 4

| Phase-configuration table 2 | | | | | | | | | | |
|---|---|---|---|---|---|---|---|---|---|---|
| 0 | 1 | 2 | 3 | 4 | 5 | 6 | 7 | 8 | 9 | 10 |
| −18.9674 | −108.409 | −218.044 | −328.035 | −437.344 | −547.074 | −657.283 | −766.079 | −877.389 | −985.611 | −1095.3 |
| | 11 | 12 | 13 | 14 | 15 | 16 | 17 | 18 | 19 | 20 |
| | −1205.85 | −1314.01 | −1423.44 | −1533.35 | −1643.38 | −1752.6 | −1862.83 | −1972.6 | −2081.06 | −2191.46 |
| | 21 | 22 | 23 | 24 | 25 | 26 | 27 | 28 | 29 | 30 |
| | −2301.03 | −2410.33 | −2520.5 | −2627.2 | −2739.18 | −2847.61 | −2959.97 | −3070.5 | −3176.17 | −3288.32 |
| | 31 | 32 | 33 | 34 | 35 | 36 | 37 | 38 | 39 | 40 |
| | −3397.6 | −3508.46 | −3616.98 | −3725.45 | −3837.63 | −3944.27 | −4055.28 | −4163.48 | −4273.94 | −4385.32 |

TABLE 4-continued

| Phase-configuration table 2 | | | | | | | | | |
|---|---|---|---|---|---|---|---|---|---|
| 41 | 42 | 43 | 44 | 45 | 46 | 47 | 48 | 49 | 50 |
| −4491.44 | −4603.1 | −4712.79 | −4823.57 | −4932.95 | −5040.66 | −5149.11 | −5259.97 | −5370.79 | −5477.34 |

Figure 9:
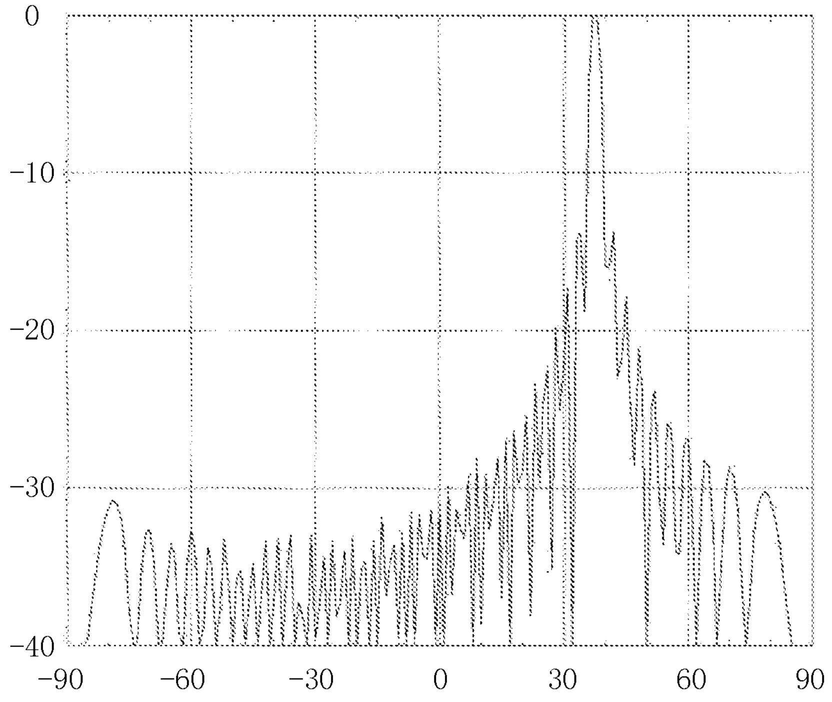
FIG. 9 is a diagram of beam pointing angles generated through a parameter calculation model according to one embodiment of the present disclosure.

Based on the phase-configuration table shown in Table 4, a diagram of the beam pointing angle is shown in FIG. 9. It is derived that a main beam is around 37° to 38°, and a half power beam width is about 2.5°.

Therefore, the beam pointing angle obtained in the technical solution of the embodiments of the present disclosure is highly consistent with the original beam pointing angle.

The present disclosure further provides in some embodiments a tunable antenna system configured to perform the above-mentioned tunable antenna control method.

The present disclosure further provides in some embodiments a tunable antenna control apparatus.

Figure 10:
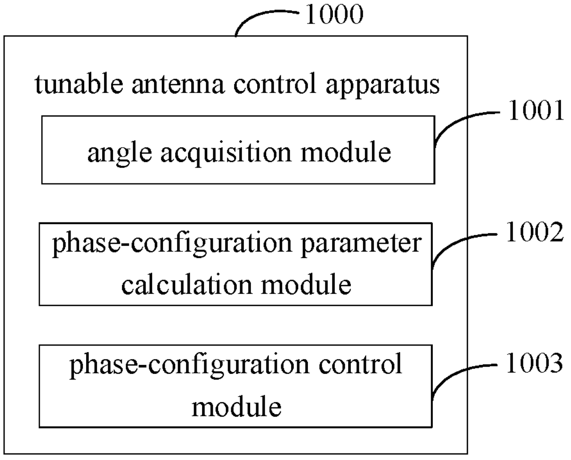
FIG. 10 is a schematic view showing a tunable antenna control apparatus according to one embodiment of the present disclosure.

As shown in FIG. 10, in one embodiment of the present disclosure, the tunable antenna control apparatus 1000 includes:

an angle acquisition module 1001, configured to acquire a beam pointing angle of a tunable antenna, a phase-configuration parameter calculation module 1002, configured to calculate a phase-configuration parameter according to the beam pointing angle through a parameter calculation model, where the parameter calculation model is an artificial intelligence model taking the beam pointing angle as an input and the phase-configuration parameter of a phase shifter as an output, and a phase-configuration control module 1003, configured to control the phase shifter of the tunable antenna to perform phase configuration according to the phase-configuration parameter outputted by the parameter calculation model.

In some embodiments of the present disclosure, the phase shifter is a tunable phase shifter including a tunable medium, and the tunable medium is one of a liquid crystal, a ferroelectric material or a ferrite material.

In some embodiments of the present disclosure, the angle acquisition module 1001 includes:

an azimuth information acquisition sub-module, configured to acquire azimuth information about a target satellite;

a state information determination sub-module, configured to determine state information about the tunable antenna according to a position and a posture of the tunable antenna; and a beam pointing angle determination sub-module, configured to determine a beam pointing angle of the tunable antenna according to the azimuth information and the state information.

In some embodiments of the present disclosure, the azimuth information acquisition sub-module is specifically configured to:

calculate the azimuth information of the target satellite based on pre-stored satellite position-related information and a current time; and/or determine the azimuth information of the target satellite according to ephemeris information, where the ephemeris information includes broadcast ephemeris and/or post-processing ephemeris.

In some embodiments of the present disclosure, the beam pointing angle determination sub-module includes:

a coordinate system transformation unit, configured to unify the azimuth information and the state information into a same coordinate system through coordinate system transformation; and a calculation unit, configured to calculate the beam pointing angle of the tunable antenna in the same coordinate system.

In some embodiments of the present disclosure, the tunable antenna control apparatus further includes:

a level ratio acquisition module, configured to acquire a level ratio of the tunable antenna in a case that the ephemeris information is not acquired;

a parameter optimization module, configured to optimize the phase-configuration parameter of the phase shifter in a case that the level ratio is less than a preset ratio threshold; and a phase-configuration result verification module, configured to take the phase-configuration parameter of the phase shifter as a phase-configuration result of the phase shifter in a case that the level ratio is not less than the preset ratio threshold.

In some embodiments of the present disclosure, the tunable antenna control apparatus further includes:

an auto-encoder creating module, configured to create an auto-encoder, where the auto-encoder includes an encoder and a decoder, the encoder is an artificial intelligence model taking the phase-configuration parameter as an input and the beam pointing angle as an output, the decoder is an artificial intelligence model taking the beam pointing angle as an input and the phase-configuration parameter as an output, and the output of the encoder serves as the input of the decoder;

a training module, configured to create a loss function and adjust a parameter of the auto-encoder according to the loss function, where the loss function is determined according to a first difference and a second difference, the first difference is a difference between input data and output data, the output data is data outputted by the decoder after inputting the input data into the encoder of the auto-encoder, and the second difference is determined according to a fitting loss of the encoder; and a parameter calculation model generation module, configured to take the decoder as the parameter calculation model in a case that the loss function satisfies a preset training condition, where the preset training condition includes at least one of the loss function being converged or the quantity of iterations of the loss function reaching a preset quantity threshold.

In some embodiments of the present disclosure, the encoder includes a target input layer and N hidden layers arranged sequentially, N being an integer greater than 1, where an N-th hidden layer serves as an output layer of the encoder, a dimension of the target input layer is determined according to the quantity of phased array units of the tunable antenna, and a dimension $u_i$ of an i-th hidden layer in the N hidden layers satisfies $u_i=\text{ceil}(u_{i-1}/\sigma)$, where ceil( ) is a round-up function, a value of $\sigma$ is 2 or 4, and i is an integer greater than 1 and less than $N-2$.

In some embodiments of the present disclosure, a dimension of the N-th hidden layer in the N hidden layers is 1, and a dimension of a $(N-1)$-th hidden layer is less than or equal to 32.

In some embodiments of the present disclosure, the decoder includes M hidden layers and a target output layer arranged sequentially, M being a positive integer, where a first hidden layer of the M hidden layers serves as an input layer of the decoder, a dimension of the first hidden layer of the M hidden layers is the same as the dimension of the N-th hidden layer of the N hidden layers of the encoder, and the dimension of the target input layer is the same as a dimension of the target output layer.

In some embodiments of the present disclosure, a dimension $v_i$ of a j-th hidden layer of the M hidden layers satisfies $v_j=\text{ceil}(v_j*\sigma)$.

In some embodiments of the present disclosure, the decoder and/or the encoder further includes an activation layer corresponding to each one of part or all of the hidden layers, and the activation layer is arranged after a corresponding hidden layer.

In some embodiments of the present disclosure, the activation layer includes a hyperbolic tangent function or a rectified linear unit.

The tunable antenna control apparatus 1000 may implement various steps of the above-mentioned tunable antenna control method and may achieve substantially the same technical effects, which will not be particularly defined herein.

Figure 11:
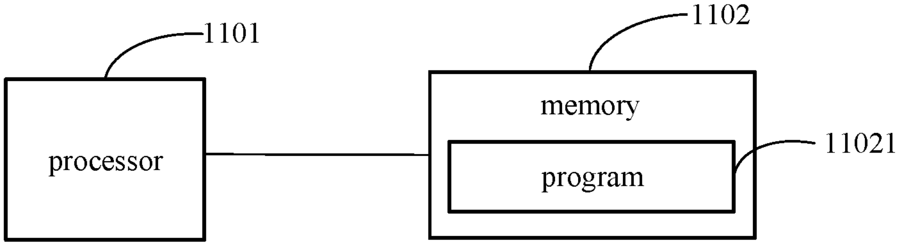
FIG. 11 is a schematic view showing an electronic device according to one embodiment of the present disclosure.

The present disclosure further provides in some embodiments an electronic device. Referring to FIG. 11, the electronic device may include a processor 1101, a memory 1102, and a program 11021 stored in the memory 1102 and capable of being executed by the processor 1101.

The program 11021, when executed by the processor 1101, performs any of the steps of the above-mentioned method embodiments, so as to achieve the same benefits, which will not be particularly defined herein.

As can be appreciated by an ordinary skilled person in the art will that all or a portion of the steps of the methods in the above-mentioned embodiments may be performed by hardware associated with program instructions, which may be stored on a readable medium.

The present disclosure further provides in some embodiments a readable storage medium having stored thereon a computer program, the computer program, when executed by a processor, may implement any of the steps in the above-mentioned method and achieve the same technical effects, and in order to avoid repetition, the description thereof will not be repeated.

The storage medium may be, such as Read-Only Memory (ROM), random Access Memory (RAM), magnetic disk or optical disk.

It should be appreciated that the above division of each module is only a division of logical functions. In actual implementation, it may be integrated into one physical entity in whole or in part, or may be physically separated. And these modules may all be implemented in the form of software called by a processing component; or all of them may be implemented in the form of hardware; some modules may be implemented in the form of software called by a processing component, and some modules are implemented in the form of hardware. For example, the determination module may be a processing component set independently, or may be integrated in one chip of the above-mentioned devices, furthermore, or may be stored in the memory of the above device in the form of program code, the functions of the above determination module is called and executed by one processing component of the above device. The implementation of other modules is similar. In addition, all or part of these modules may be integrated or implemented independently. The processing components described herein may be an integrated circuit having a processing capability of signals. In the implementation process, each step of the above method or each of the above modules may be completed by an integrated logic circuit of hardware in the processor component or an instruction in a form of software For example, each module, unit, sub-unit, or sub-module may be one or more integrated circuits configured to implement the above method, such as: one or more specific integrated circuits (Application Specific Integrated Circuit, ASIC), or, one or more microprocessors (digital signal processor, DSP), or, one or more field programmable gate arrays (Field Programmable Gate Array, FPGA), etc. For another example, when one of the above modules is implemented in the form of a processing element that schedules program code, the processing element may be a general-purpose processor, such as a Central Processing Unit (CPU) or other processor capable of calling the program codes. As another example, the modules may be integrated together and implemented in the form of a system-on-a-chip (SOC).

The above embodiments are optional embodiments of the present disclosure, it should be appreciated that those skilled in the art may make various improvements and modifications without departing from the principle of the present disclosure, and theses improvement and modifications shall fall within the scope of the present disclosure.

What is claimed is:

1. A tunable antenna control method, comprising:

acquiring a beam pointing angle of a tunable antenna;

calculating a phase-configuration parameter according to the beam pointing angle through a parameter calculation model, wherein the parameter calculation model is an artificial intelligence model taking the beam pointing angle as an input and the phase-configuration parameter of a phase shifter as an output; and controlling the phase shifter of the tunable antenna to perform phase configuration according to the phase-configuration parameter outputted by the parameter calculation model;

wherein before the calculating the phase-configuration parameter according to the beam pointing angle through the parameter calculation model, the method further comprises:

creating an auto-encoder, wherein the auto-encoder comprises an encoder and a decoder, the encoder is an artificial intelligence model taking the phase-configuration parameter as an input and the beam pointing angle as an output, the decoder is an artificial intelligence model taking the beam pointing angle as an input and the phase-configuration parameter as an output, and the output of the encoder serves as the input of the decoder;

creating a loss function and adjusting a parameter of the auto-encoder according to the loss function, wherein the loss function is determined according to a first difference and a second difference, the first difference is a difference between input data and output data, the output data is data outputted by the decoder after inputting the input data into the encoder of the auto-encoder, and the second difference is determined according to a fitting loss of the encoder;

taking the decoder as the parameter calculation model in a case that the loss function satisfies a preset training condition, wherein the preset training condition comprises at least one of the loss function being converged or the quantity of iterations of the loss function reaching a preset quantity threshold.

2. The method according to claim 1, wherein the phase shifter is a tunable phase shifter comprising a tunable medium, and the tunable medium is one of a liquid crystal, a ferroelectric material or a ferrite material.

3. The method according to claim 1, wherein the acquiring the beam pointing angle of the tunable antenna, comprises:

acquiring azimuth information of a target satellite;

determining state information of the tunable antenna according to a position and a posture of the tunable antenna; and determining the beam pointing angle of the tunable antenna according to the azimuth information and the state information.

4. The method according to claim 3, wherein the acquiring the azimuth information of the target satellite, comprises:

calculating the azimuth information of the target satellite based on pre-stored satellite position-related information and a current time; and/or determining the azimuth information of the target satellite according to ephemeris information, wherein the ephemeris information comprises broadcast ephemeris and/or post-processing ephemeris.

5. The method according to claim 4, wherein the determining the beam pointing angle of the tunable antenna according to the azimuth information and the state information, comprises:

unifying the azimuth information and the state information into a same coordinate system through coordinate system transformation; and calculating the beam pointing angle of the tunable antenna in the same coordinate system.

6. The method according to claim 4, wherein after the controlling the phase shifter of the tunable antenna to perform phase configuration according to the phase-configuration parameter outputted by the parameter calculation model, the method further comprises:

acquiring a level ratio of the tunable antenna in a case that the ephemeris information is not acquired;

optimizing the phase-configuration parameter of the phase shifter in a case that the level ratio is less than a preset ratio threshold; and taking the phase-configuration parameter of the phase shifter as a phase-configuration result of the phase shifter in a case that the level ratio is not less than the preset ratio threshold.

7. The method according to claim 1, wherein the encoder comprises a target input layer and N hidden layers arranged sequentially, N being an integer greater than 1, wherein an N-th hidden layer serves as an output layer of the encoder, a dimension of the target input layer is determined according to the quantity of phased array units of the tunable antenna, and a dimension $u_i$ of an i-th hidden layer in the N hidden layers satisfies $u_i=\mathrm{ceil}(u_{i-1}/\sigma)$, wherein ceil ( ) is a round-up function, a value of σ is 2 or 4, and i is an integer greater than 1 and less than N−2.

8. The method according to claim 7, wherein a dimension of the N-th hidden layer in the N hidden layers is 1, and a dimension of a (N−1)-th hidden layer is less than or equal to 32.

9. The method according to claim 7, wherein the decoder comprises M hidden layers and a target output layer arranged sequentially, M being a positive integer, wherein a first hidden layer of the M hidden layers serves as an input layer of the decoder, a dimension of the first hidden layer of the M hidden layers is the same as the dimension of the N-th hidden layer of the N hidden layers of the encoder, and the dimension of the target input layer is the same as a dimension of the target output layer.

10. The method according to claim 9, wherein a dimension $v_i$ of a j-th hidden layer of the M hidden layers satisfies $v_j=\mathrm{ceil}(v_j*\sigma)$.

11. The method according to claim 10, wherein the decoder and/or the encoder further comprises an activation layer corresponding to each one of part or all of the hidden layers, and the activation layer is arranged after a corresponding hidden layer.

12. The method according to claim 11, wherein the activation layer comprises a hyperbolic tangent function or a rectified linear unit.

13. A tunable antenna system configured to perform the tunable antenna control method according to claim 1.

14. The system according to claim 13, wherein the phase shifter is a tunable phase shifter comprising a tunable medium, and the tunable medium is one of a liquid crystal, a ferroelectric material or a ferrite material.

15. The system according to claim 13, wherein the acquiring the beam pointing angle of the tunable antenna comprises:

acquiring azimuth information of a target satellite;

determining state information of the tunable antenna according to a position and a posture of the tunable antenna; and determining the beam pointing angle of the tunable antenna according to the azimuth information and the state information.

16. The system according to claim 13, wherein the encoder comprises a target input layer and N hidden layers arranged sequentially, N being an integer greater than 1, wherein an N-th hidden layer serves as an output layer of the encoder, a dimension of the target input layer is determined according to the quantity of phased array units of the tunable antenna, and a dimension $u_i$ of an i-th hidden layer in the N hidden layers satisfies $u_i=\mathrm{ceil}(u_{i-1}/\sigma)$, wherein ceil ( ) is a round-up function, a value of σ is 2 or 4, and i is an integer greater than 1 and less than N−2.

17. The system according to claim 16, wherein a dimension of the N-th hidden layer in the N hidden layers is 1, and a dimension of a (N−1)-th hidden layer is less than or equal to 32.

18. The system according to claim 16, wherein the decoder comprises M hidden layers and a target output layer arranged sequentially, M being a positive integer, wherein a first hidden layer of the M hidden layers serves as an input layer of the decoder, a dimension of the first hidden layer of the M hidden layers is the same as the dimension of the N-th hidden layer of the N hidden layers of the encoder, and the dimension of the target input layer is the same as a dimension of the target output layer.

19. The system according to claim 18, wherein a dimension $v_i$ of a j-th hidden layer of the M hidden layers satisfies $v_j=\mathrm{ceil}(v_j*\sigma)$.

20. The system according to claim 19, wherein the decoder and/or the encoder further comprises an activation layer corresponding to each one of part or all of the hidden layers, and the activation layer is arranged after a corresponding hidden layer.

* * * * *